Oct. 19, 1937.  H. SINCLAIR  2,096,071
HYDRAULIC COUPLING
Filed Nov. 7, 1935
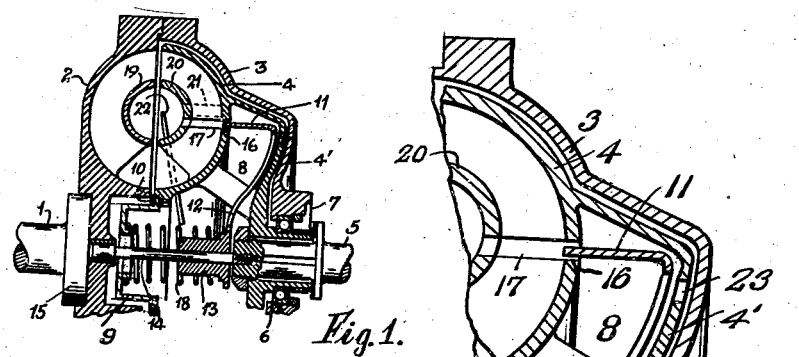
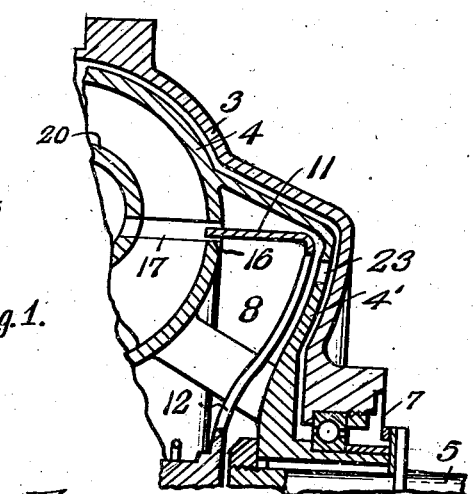
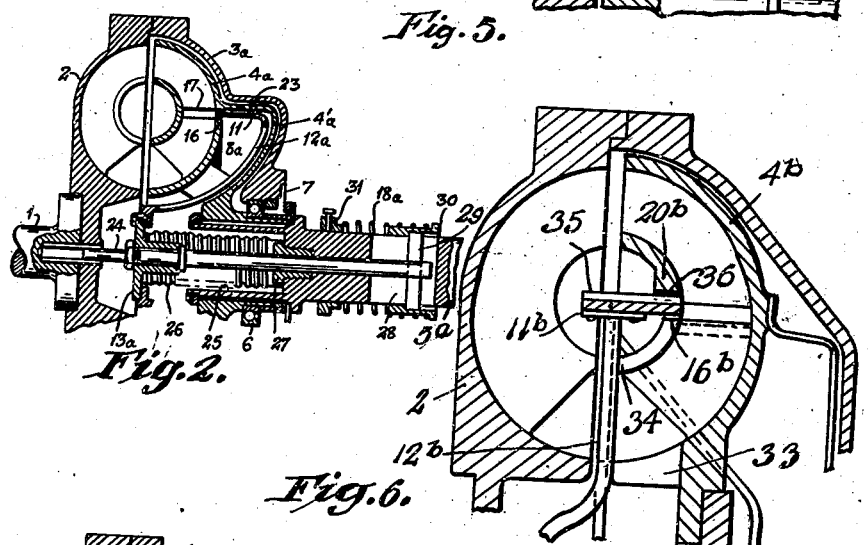
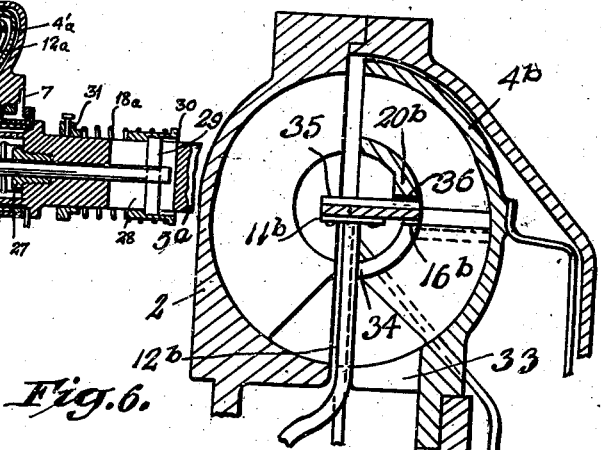
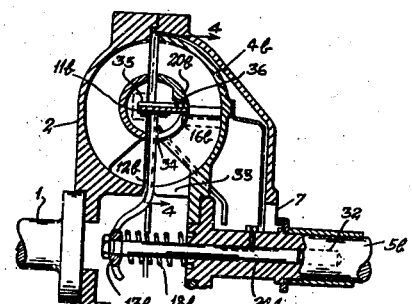
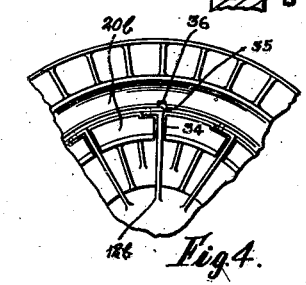

Patented Oct. 19, 1937

2,096,071

UNITED STATES PATENT OFFICE 2,096,071

HYDRAULIC COUPLING

Harold Sinclair, Kensington, London, England

Application November 7, 1935, Serial No. 48,625
In Great Britain November 14, 1934

21 Claims. (Cl. 60—54)

The present invention relates to hydraulic couplings of the kinetic type, having a vaned impeller member in the form of an annularly dished shell juxtaposed to a vaned runner member of similar form, so that the impeller and runner together form a toroidal working circuit in which the working liquid can circulate in the form of a vortex ring.

It is well known that the torque required to stall the runner of such a coupling while the impeller is rotated at a constant speed is of the order of 15 to 20 times the normal torque load corresponding to a slip of 2 to 3 per cent.

Although such a coupling has the useful property of cushioning the transmission of sudden shock loads and vibrations, it is of little value as a torque-limiting device in those applications where the prime mover has a substantially constant speed characteristic, such as an alternating-current motor. For example, when applied to such machinery as rock crushers, rotary well-drilling rigs, rolling mills, dredging cutters, conveyors, haulage winches and so forth, which are liable to be stalled by overload, the known types of hydraulic coupling cannot serve as a load limiting device having a reasonable ratio of stalling torque to normal driving torque.

Such couplings are often employed, for example in self-propelled vehicles, to couple an engine to a change-speed gear of the kind in which the various gear ratios are engaged by the operation of friction clutches or brakes. With gears of this kind it is possible to make rapid changes from one ratio to another, the friction clutches or brakes serving to force the speeds of the driving and driven shafts of the gearing into the ratio of the engaged gear. Owing to the high inertia of the vehicle, the speed of the driven shaft of the gear cannot be varied rapidly, so that a sudden gear change causes a sudden change in the speed of the driving shaft of the gear and of the coupling runner attached thereto. Since, owing to the inertia of the engine, the coupling impeller cannot change speed as rapidly as does the coupling runner when the gear is suddenly changed, the slip in the coupling rises temporarily to a high value, causing the torque to rise to many times the normal torque.

An object of the present invention is to provide an improved hydraulic coupling which when running at normal speed will transmit normal torque with a low slip, but when the torque reaches a predetermined value will permit the driven shaft to stall at a reasonable torque which may be of the order of full load torque.

My United States Patent No. 1,831,770 describes a hydraulic coupling of the kinetic type having an annular ring, which can be slid, by means of a pedal, into and out of the working circuit, for the purpose of varying the torque transmission capacity of the coupling. When that arrangement is used under conditions where sudden variations in the relative speed of the impeller and runner may occur, it is essential for the operator to time accurately the operation of the pedal, if abnormal torque loads are to be avoided.

According to the present invention, a hydraulic coupling of the kinetic type set forth, and comprising a throttling element which is normally clear of the vortex stream of working liquid circulating within the hydraulic working circuit of the coupling and which can be slid into the path of this stream for the purpose of reducing the torque transmission capacity of the coupling, is characterized in that this throttling element is biased (for example by a spring) towards its normal position, but is adapted to be drawn automatically into the stream under the influence of a fluid pressure difference which is set up between the ends of the throttling element in consequence of the torque transmitted by the coupling rising to a high value.

The arrangement may be such that the throttling element is normally accommodated in a chamber formed on the back of one of the vaned coupling elements or formed within core guide members in the working circuit, so that the throttling element is normally clear of the hydraulic working circuit of the coupling and can be slid into that circuit through an aperture in the boundary thereof for the purpose of reducing the torque transmission capacity of the coupling, the throttling element being adapted to be drawn automatically into its operative position in said circuit under the influence of a fluid pressure difference which is set up between the spaces on opposite sides of said aperture when the torque transmitted by the coupling rises to a high value.

The specific constructions hereinafter illustrated are to be considered in an illustrative rather than in a limiting sense, as various changes may be made within the scope of my invention as defined in the appended claims.

The invention will be further described with reference to the constructional examples shown in the accompanying diagrammatic drawing, in which Figs. 1, 2, 3 and 6 show respectively three alternative arrangements in sectional side elevation, Fig. 4 is an end elevation of a detail, viewed from the line 4—4 of Fig. 3, and Fig. 5 shows a modification of the arrangement shown in Fig. 1.

In the arrangement shown in Fig. 1 the impeller 2 is fixed directly to the driving shaft 1, and to the periphery of the impeller is secured a dished casing 3 which encloses the runner 4. The driven shaft 5 passes through this casing, in which it may be supported by a bearing 6; and a gland 7, which is preferably of the diaphragm type as described in my United States Patent No. 2,011,735 prevents escape of liquid between the casing and the driven shaft. To the back of the dished shell of the runner 4 is secured a saucer-shaped element 4' the diameter of the outer edge of which is somewhat larger than the diameter of the circular axis of the working circuit. The middle of the element 4' is provided with a boss which is fixed to the driven shaft 5, so that a chamber 8 is formed bounded at the rear by the element 4' and at the front by the radially inner part of the shell of the runner 4 and by a flanged cup-shaped pressed member 9 fixed to the inner part of the runner shell by screws 10. A short cylindrical ring valve 11, having a diameter slightly less than the diameter of the chamber 8, is normally housed in the chamber, being mounted on a spider 12 the hub 13 of which is slidable along a rod 14 lying on the coupling axis and having its ends supported by the driving and driven coupling parts. The rod is screwed into the end of the driven shaft 5 and journalled at 15 in the boss of the impeller.

The front edge of the ring valve normally lies in an annular aperture 16 in the runner shell. If the spider 12 is slid towards the impeller 2, the ring valve 11 projects through this aperture into the working circuit, the runner vanes being suitably slotted (as at 17) to permit this movement. A compression spring 18 disposed between the hub of the spider and an inwardly turned flange on the inner edge of a central hole in the bottom of the cup 9, urges the ring valve towards its inoperative position.

There may be provided, in known manner, one or two core guide members 19 and 20 disposed adjacent to the circular axis of the working circuit, and liquid and air transfer ducts 21 and 22 respectively, may communicate between the chamber 8 containing the ring valve and the core space. Alternatively, as shown in Fig. 5, the chamber which normally houses the ring valve may communicate by a port 23, with the space between the runner parts 4 and 4' and the dished casing 3, which space communicates with the circuit by means of the gap between the radially outer parts of the impeller and the runner.

The spring 18 is just strong enough to keep the ring valve 11 in its inoperative position when the slip in the coupling is normal and the circulation velocity is accordingly low. When, however, the slip increases and the circulation velocity accordingly rises, a difference is established between the fluid pressure in the circuit adjacent to the ring valve chamber 8, which is sufficient to draw the ring valve into the circuit. This checks the vortex circulation of the liquid and prevents an excessive rise in torque. The pressure difference is thought to be due mainly to the high velocity head of the liquid stream in the working circuit passing the ring valve aperture 16.

In the arrangement shown in Fig. 2, the spring pressure, and consequently the overload capacity of the coupling, can be easily adjusted. The ring valve spider 12a is fixed to a rod 24 co-axial with and slidable longitudinally of the coupling. The front end of the driven shaft 5a is counter-bored at 25 to accommodate a bellows gland one end of which is sealed to the hub 13a of the spider 12a and the other end of which is sealed to the driven shaft by being clamped under a hollow screw 27. The rear end of the rod 24 passes through the counterbore and through an axial hole in the driven shaft to a slot 28 in the driven shaft which accommodates a transverse cotter pin 29 fixed to the end of the rod. The ends of this pin engage a collar 30 slidable on the driven shaft and urged to the rear by a spring 18a acting against a collar 31 fixed to the driven shaft by a set screw and capable of being adjusted to various positions along the shaft to vary the setting of the spring.

In this construction the ring valve 11 is arranged similarly to the ring valve in Fig. 1. The ring valve chamber 8a, however, communicates by a port 23 or series of such ports with the space between the runner parts 4a and 4'a and the casing element 3a. Operation of the automatic ring valve in this coupling is the same as that hereinbefore described with reference to Fig. 1. The bellows sealing device is particularly suitable in this construction, since it avoids the friction inherent in ordinary packing glands, which would reduce the sensitivity of the automatic ring valve.

Where the coupling is provided with core guide members in the working circuit, the ring valve may be accommodated in the core space, as shown in Figs. 3 and 4. In this example the ring valve spider 12b is mounted adjacent to the impeller 2 and is fixed to a rod 24b slidably carried in a counterbore 32 in the front end of the driven shaft 5b, the shell of the runner 4b and the core member 20b being slotted in way of the spider arms, at 33 and 34 respectively, to allow the ring valve to move into its operative position, through a circumferential gap 16b in the runner core guide member 20b against the pressure of a spring 18b disposed between the hub 13b of the spider and the front end of the driven shaft. The ring valve is provided with one or more longitudinal ribs 35, engaged in a recess or recesses 36 in the core guide member 20b; this arrangement prevents the spider from rubbing on the edges of the slots 33 and 34.

The arrangement shown in Figs. 3 and 4 may be modified as shown in Fig. 6, the core guide member on the impeller 2 being omitted. Under normal load conditions at low slip, the valve 11b remains in its inoperative position as shown. When, however, the slip increases, the velocity of the vortex circulation increases, with the result that a pressure difference is set up between the end of the valve nearest the boundary of the working circuit in the element 4b and the end farther from this boundary, such that the valve is drawn into and throttles the circulating stream, thus reducing the torque transmission capacity of the coupling.

I claim:

1. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a throttling element which is normally clear of the vortex stream of working liquid, and which is slidable into the path of said stream for the purpose of reducing the torque transmission capacity of the coupling, and biasing means for urging said throttling element towards its normal inoperative position, but which permit said throttling element to be drawn automatically into the path of said stream under the influence of fluid pressure when the slip in the coupling is high.

2. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a ring valve co-axial with, and slidable longitudinally of the coupling, so as to be capable of obstructing the circulating vortex, and biasing means which urge said ring valve towards a position where it is clear of the path of the vortex stream, but which exert such a force that said throttling element can be drawn automatically into the path of said stream under the influence of fluid pressure when the slip in the coupling is high.

3. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a ring valve co-axial with, and slidable longitudinally of the coupling, and biasing means which urge said ring valve into one extreme position where said ring valve lies clear of the vortex stream of circulating liquid with one end adjacent to the path of said stream and the other end in a space remote from said stream and communicating with said circuit, said ring valve being capable of being drawn automatically into said stream by fluid pressure exerted by said stream when its circulation velocity is high.

4. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, said circuit having a boundary with an aperture formed therein, a throttling element which is normally clear of said circuit and which is capable of being slid into said circuit through said aperture, and biasing means which serve to urge said throttling element towards its normal inoperative position, said throttling element being capable of being drawn automatically into its operative position into said circuit as a result of a fluid pressure difference which is set up between the spaces on opposite sides of said aperture when the torque transmitted by the coupling rises to a high value.

5. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, one of said shells having an aperture, a chamber formed on the back of said apertured shell, a throttling element which is normally accommodated in said chamber and which can slide through said aperture into said circuit, biasing means which serve to urge said throttling element towards its inoperative position in said chamber, and a communication between said chamber and said working circuit in addition to said aperture, said communication permitting, when the slip in the coupling exceeds a predetermined value, the establishing of a fluid pressure difference, between the ends of said aperture, sufficient to overcome the force exerted by said biasing means.

6. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, one of said shells having an aperture, a chamber formed on the back of said apertured shell, a throttling element which is normally accommodated in said chamber and which can slide through said aperture into said circuit, biasing means which serve to urge said throttling element towards its inoperative position in said chamber, and a duct leading from said chamber and opening into said toroidal working circuit in the neighbourhood of the circular axis thereof, said duct permitting, when the slip in the coupling exceeds a predetermined value, the establishing of a fluid pressure difference, between the ends of said aperture, sufficient to overcome the force exerted by said biasing means.

7. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, core guide members in said circuit partly enclosing an annular space in the neighbourhood of the circular axis of said circuit, one of said shells having an aperture, a chamber formed on the back of said apertured shell, a throttling element which is normally accommodated in said chamber and which can slide through said aperture into said circuit, biasing means which serve to urge said throttling element towards its inoperative position in said chamber, and a duct communicating between said chamber and said annular core space.

8. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, the shell of said runner having an aperture, a chamber formed on the back of said runner, a throttling element which is normally accommodated in said chamber and which can slide through said aperture into said circuit, biasing means which serve to urge said throttling element towards its inoperative position in said chamber, and a duct leading from said chamber and opening into said toroidal working circuit in the neighbourhood of the circular axis thereof, said duct permitting, when the slip in the coupling exceeds a predetermined value, the establishing of a fluid pressure difference, between the ends of said aperture, sufficient to overcome the force exerted by said biasing means.

9. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, core guide members in said circuit partly enclosing an annular space in the neighbourhood of the circular axis of said circuit, the shell of said runner having an aperture, a chamber formed on the back of said runner, a throttling element which is normally accommodated in said chamber and which can slide through said aperture into said circuit, biasing means which serve to urge said throttling element towards its inoperative position in said chamber, and a duct communicating between said chamber and said annular core space.

10. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a chamber formed on the back of one of said vaned elements, a casing attached to the other of said vaned elements, a space being formed between said casing and the one of said vaned elements provided with said chamber, which chamber communicates by a port with said space, and the shell of said vaned element provided with said chamber having an aperture, a throttling element which is normally accommodated in said chamber and which can slide through said aperture into said circuit, and biasing means which serve to urge said throttling element towards its inoperative position in said chamber.

11. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, core guide members in said circuit partly enclosing an annular space in the neighbourhood of the circular axis of said circuit, one of said core guide members having an aperture, a throttling element normally accommodated within said annular space and capable of being slid through said aperture into said working circuit, and biasing means which urge said throttling element towards its normal inoperative position within said annular space, but which permit said throttling element to be drawn automatically into the path of said stream under the influence of fluid pressure when the slip in the coupling is high.

12. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a ring valve which is normally accommodated in the neighbourhood of the circular axis of said working circuit and which can be slid towards the shell of one of said vaned coupling elements for the purpose of reducing the torque transmission capacity of the coupling, and means for biasing said ring valve towards its normal inoperative position, said means permitting said ring valve to move towards said last-mentioned shell under the influence of a fluid pressure difference which is set up between the ends of said ring valve when the torque transmitted by said coupling rises to a high value.

13. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a throttling element which is normally clear of the vortex stream of working liquid, and which is slidable into the path of said stream for the purpose of reducing the torque transmission capacity of the coupling, driving and driven shafts on which said impeller and runner members are respectively mounted, a rod co-axial with and slidably mounted in one of said shafts, said throttling element being mounted on said rod, and biasing means for urging said throttling element towards its normal inoperative position, but which permit said throttling element to be drawn automatically into the path of said stream under the influence of fluid pressure when the slip in the coupling is high.

14. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a throttling element which is normally clear of the vortex stream of working liquid, and which is slidable into the path of said stream for the purpose of reducing the torque transmission capacity of the coupling, spring means for biasing said throttling element towards its normal inoperative position, but which permit said throttling element to be drawn automatically into the path of said stream under the influence of fluid pressure when the slip in the coupling is high, and an adjustable member located outside said coupling and operable for varying the setting of said spring means.

15. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a throttling element which is normally clear of the vortex stream of working liquid, and which is slidable into the path of said stream for the purpose of reducing the torque transmission capacity of the coupling, driving and driven shafts on which said impeller and runner members are respectively mounted, a rod supporting said throttling element and slidably mounted in an axial bore in one of said shafts, a bellows device arranged to seal said rod with respect to the one of said shafts in which it is mounted, an adjustable member located outside said coupling, and spring means for biasing said throttling element towards its normal inoperative position, said spring means being operatively connected between said rod and said adjustable member.

16. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, the boundary wall of said circuit having an annular aperture, a ring valve slidable into and out of said circuit through said aperture, biasing means for urging said ring valve out of said circuit, a chamber which accommodates said ring valve when it is out of said circuit, and means communicating between said chamber and said circuit at a place in said circuit remote from said aperture, said biasing means permitting said throttling element to be drawn automatically into the path of said stream under the influence of fluid pressure when the slip in the coupling is high.

17. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, the boundary wall of said circuit having an annular aperture, a ring valve slidable into and out of said circuit through said aperture, biasing means for urging said ring valve out of said circuit, a chamber which accommodates said ring valve when it is out of said circuit, and means communicating between said chamber and the junction in said circuit between said impeller and runner members, said biasing means permitting said throttling element to be drawn automatically into the path of said stream under the influence of fluid pressure when the slip in the coupling is high.

18. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, one of said shells having an annular aperture, a chamber formed on the back of said apertured shell, a ring valve normally housed in said chamber and slidable through said aperture into said circuit, biasing means for urging said ring valve towards its inoperative position in said chamber, and a communication between said chamber and said working circuit in addition to said aperture, said communication permitting, when the slip in the coupling exceeds a predetermined value, the establishing of a fluid pressure difference, between the ends of said aperture, sufficient to overcome the force exerted by said biasing means.

19. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, one of said shells having an annular aperture, a chamber formed on the back of said apertured shell, a ring valve normally housed in said chamber and slidable through said aperture into said circuit, biasing means for urging said ring valve towards its inoperative position in said chamber, and a duct leading from said chamber and opening into said toroidal working circuit in the neighbourhood of the circular axis thereof, said duct permitting, when the slip in the coupling exceeds a predetermined value, the establishing of a fluid pressure difference, between the ends of said aperture, sufficient to overcome the force exerted by said biasing means.

20. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, a throttling element which is normally clear of the vortex stream of working liquid, and which is slidable into the path of said stream for the purpose of reducing the torque transmission capacity of the coupling, and spring means operatively connected with said throttling element and just strong enough to keep said throttling element in its normal inoperative position when the slip in the coupling is low but to permit said throttling element to be drawn into said circuit under the influence of the velocity head of the vortex circulation when the slip is high.

21. A hydraulic coupling of kinetic type having a vaned impeller member in the form of an annularly dished shell juxtaposed to a vaned runner member of similar form, so that said impeller and runner together form a toroidal working circuit in which working liquid can circulate in the form of a vortex ring, the boundary wall of said circuit having an annular aperture, a ring valve slidable into and out of said circuit through said aperture, a chamber which accommodates said ring valve when it is out of said circuit, means communicating between said chamber and said circuit at a place in said circuit remote from said aperture, and spring means operatively connected with said throttling element and just strong enough to keep said throttling element in its normal inoperative position when the slip in the coupling is low but to permit said throttling element to be drawn into said circuit under the influence of the velocity head of the vortex circulation when the slip is high.

HAROLD SINCLAIR.